United States Patent
Lee et al.

(10) Patent No.: US 8,582,051 B2
(45) Date of Patent: Nov. 12, 2013

(54) BACKLIGHT UNIT AND THE DISPLAY DEVICE HAVING THE SAME

(75) Inventors: Kum Tae Lee, Seoul (KR); Moon Jeong Kim, Seoul (KR); Duk Hyun Yun, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 175 days.

(21) Appl. No.: 13/159,652

(22) Filed: Jun. 14, 2011

(65) Prior Publication Data

US 2011/0304796 A1    Dec. 15, 2011

(30) Foreign Application Priority Data

Jun. 15, 2010  (KR) .................. 10-2010-0056787
Aug. 17, 2010  (KR) .................. 10-2010-0079540

(51) Int. Cl.
*G02F 1/1333* (2006.01)

(52) U.S. Cl.
USPC .................. 349/60; 349/58; 349/59

(58) Field of Classification Search
USPC ..................................... 349/58–60
See application file for complete search history.

(56) References Cited

U.S. PATENT DOCUMENTS

| | | | |
|---|---|---|---|
| 2005/0073621 A1 | 4/2005 | Lee et al. | 349/53 |
| 2005/0253980 A1* | 11/2005 | Saito et al. | 349/64 |
| 2005/0265029 A1 | 12/2005 | Epstein et al. | 362/339 |
| 2006/0256255 A1 | 11/2006 | Minami | 349/65 |
| 2006/0290836 A1 | 12/2006 | Chang | 349/58 |
| 2007/0121031 A1 | 5/2007 | Kitamura et al. | 349/65 |
| 2007/0279728 A1 | 12/2007 | Murakata | 359/245 |
| 2008/0123336 A1 | 5/2008 | Arita et al. | 362/257 |
| 2008/0291697 A1 | 11/2008 | Sun | 362/628 |
| 2009/0207343 A1 | 8/2009 | Mifune | 349/65 |
| 2009/0237584 A1 | 9/2009 | Kim | 349/58 |
| 2009/0273732 A1 | 11/2009 | Shimura et al. | 349/65 |
| 2009/0303410 A1* | 12/2009 | Murata et al. | 349/58 |
| 2010/0045898 A1 | 2/2010 | Lee et al. | 349/65 |
| 2010/0110330 A1 | 5/2010 | Ajichi et al. | 349/62 |

FOREIGN PATENT DOCUMENTS

| | | |
|---|---|---|
| EP | 1 867 916 A1 | 12/2007 |
| EP | 2 028 635 A1 | 2/2009 |
| JP | 2006-236701 A | 9/2006 |
| KR | 10-2008-002371 A | 1/2008 |
| KR | 10-2009-0057573 A | 6/2009 |
| KR | 10-2009-0071912 A | 7/2009 |

(Continued)

OTHER PUBLICATIONS

European Search Report dated Sep. 26, 2011 issued in Application No. 11 17 0003.

*Primary Examiner* — Phu Vu
(74) *Attorney, Agent, or Firm* — KED & Associates LLP (57) ABSTRACT

Provided are a backlight unit and a display device having the same. The backlight unit configured to emit light onto a liquid crystal panel in which one screen is defined into a plurality of display areas includes a bottom frame having a bottom surface and a sidewall, a plurality of light emitting diodes (LEDs) disposed on the bottom surface of the bottom frame, the plurality of LEDs defining a plurality of light emitting areas corresponding to the display areas of the liquid crystal panel, at least one module board supporting the plurality of LEDs, an integrated light guide plate covering the plurality of LEDs, the integrated light guide plate being disposed on the plurality of light emitting areas corresponding to one screen, and an alignment unit for aligning the integrated light guide plate with the plurality of LEDs.

18 Claims, 11 Drawing Sheets

(56) References Cited

FOREIGN PATENT DOCUMENTS

| KR | 10-2009-0121926 A | 11/2009 |
| KR | 10-2010-0024324 A | 3/2010 |
| KR | 10-2010-0054209 A | 5/2010 |
| WO | WO 2007/138294 A1 | 12/2007 |
| WO | WO 2008/143418 A1 | 11/2008 |

* cited by examiner

BACKLIGHT UNIT AND THE DISPLAY DEVICE HAVING THE SAME

CROSS-REFERENCE TO RELATED APPLICATIONS

The present application claims priority under 35 U.S.C. 119 and 35 U.S.C. 365 to Korean Patent Application No. 10-2010-0056787 (filed on Jun. 15, 2010) and 10-2010-0079540 (filed on Aug. 17, 2010), which is hereby incorporated by reference in its entirety.

BACKGROUND

The present disclosure relates a backlight unit and a display device having the same, and more particularly, to a display device in which a backlight unit is realized by a light emitting diode.

A light emitting diode (LED) may constitute a light emitting source using compound semiconductor materials such as GaAs-based materials, AlGaAs-based materials, GaN-based materials, InGaN-based materials and InGaAlP-based materials.

Such a light emitting device is packaged, and thus is being used as a light emitting apparatus that emits light having various colors. The light emitting apparatus is being used as a light source in various fields, e.g., lighting displays, character displays, and image displays.

SUMMARY

Embodiments provide a backlight unit having a new structure and a display device having the same.

Embodiments also provide a slim backlight unit and a display device having the same.

Embodiments also provide a backlight unit to which a separate driving method is applied and a display device having the same.

In one embodiment, a backlight unit configured to emit light onto a liquid crystal panel in which one screen is defined into a plurality of display areas includes: a bottom frame having a bottom surface and a sidewall; a plurality of light emitting diodes (LEDs) disposed on the bottom surface of the bottom frame, the plurality of LEDs defining a plurality of light emitting areas corresponding to the display areas of the liquid crystal panel; at least one module board supporting the plurality of LEDs; an integrated light guide plate covering the plurality of LEDs, the integrated light guide plate being disposed on the plurality of light emitting areas corresponding to one screen; and an alignment unit for aligning the integrated light guide plate with the plurality of LEDs.

In another embodiment, a display device includes: a bottom frame having a bottom surface having a square shape and a sidewall; a plurality of LEDs disposed on the bottom surface of the bottom frame, the plurality of LEDs being separately driven; an integrated light guide plate covering the plurality of LEDs; and a display panel disposed on the light guide plate.

According to the embodiments, since the light guide plate is formed in one body to correspond to a screen of the display panel in the backlight unit in which the light emitting areas are locally driven, a dark line occurring between the light guide plates 30 may not occur and a slim backlight unit may be manufactured.

Also, the separate driving method such as a local dimming method or impulsive method may be provided to reduce power consumption as well as improve contrast of a screen, thereby improving an image quality of the display device.

Also, since the light guide plate is formed in one body, manufacturing costs may be reduced. In addition, the coupling part may be disposed on the edge portion to easily assemble the backlight unit.

The details of one or more embodiments are set forth in the accompanying drawings and the description below. Other features will be apparent from the description and drawings, and from the claims.

DETAILED DESCRIPTION OF THE EMBODIMENTS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

In this specification, when it is described that one comprises (or includes or has) some elements, it should be understood that it may comprise (or include or has) only those elements, or it may comprise (or include or have) other elements as well as those elements if there is no specific limitation.

In the drawings, anything unnecessary for describing the present disclosure will be omitted for clarity, and thicknesses are enlarged for the purpose of clearly illustrating layers and areas. Like reference numerals in the drawings denote like elements, and thus their description will be omitted.

It will also be understood that when a layer, a film, an area or a plate is referred to as being 'on' another one, it can be directly on the other one, or one or more intervening layers, films, areas or plates may also be present. On the other hand, it will also be understood that when a layer, a film, an area or a plate is referred to as being "directly on" another one, intervening layers, films, areas, and plates may not be present.

In a display device according to embodiments, a light guide plate constituting a backlight unit which is locally driven is formed in one body to correspond to the entire screen of a display panel.

Hereinafter, a display device according to a first embodiment will be described with reference to FIGS. 1 to 4.

Figure 1:
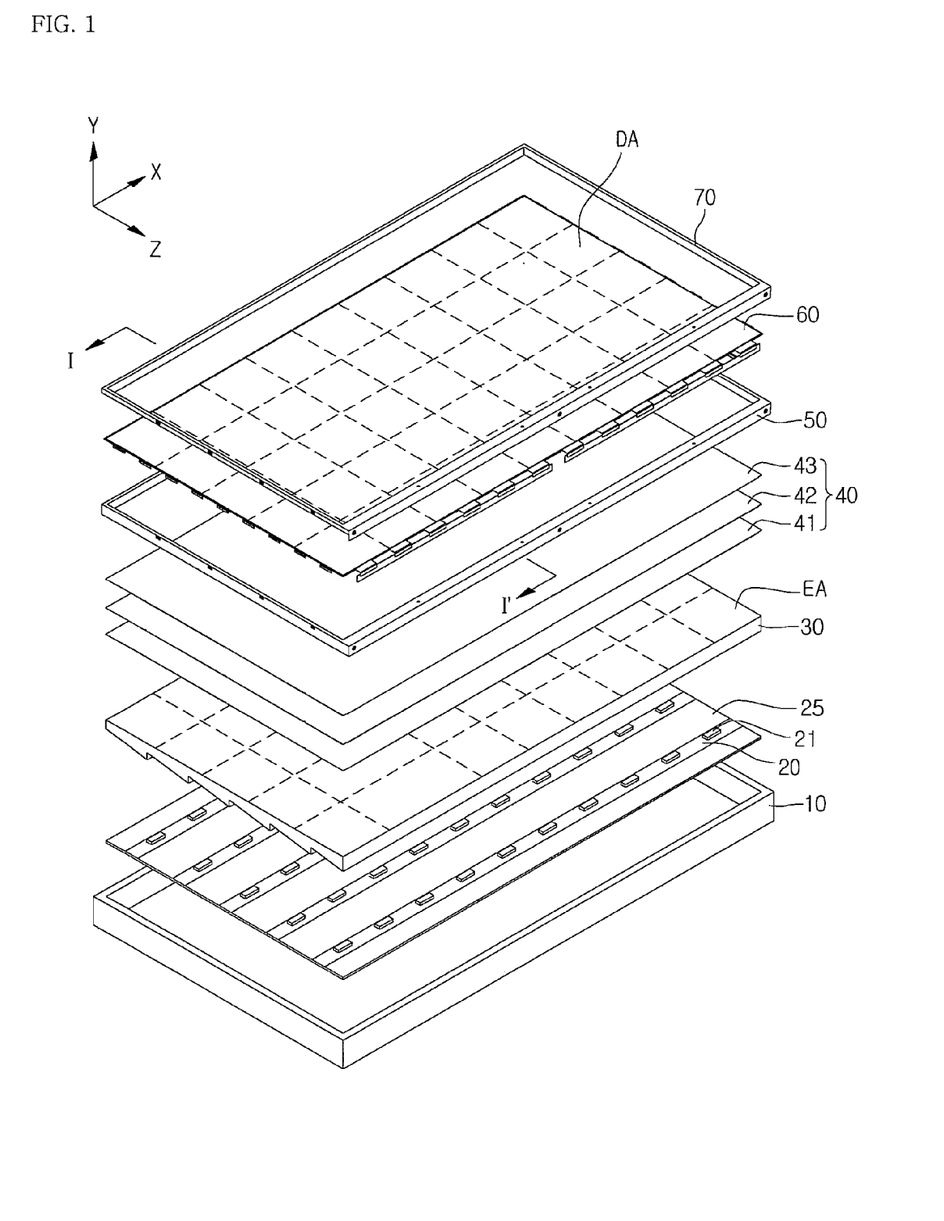
FIG. 1 is an exploded perspective view of a display device according to a first embodiment.
Figure 2:
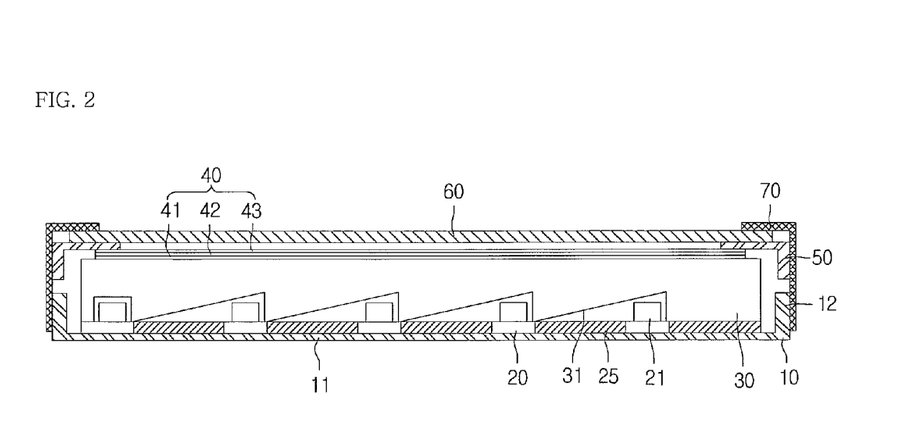
FIG. 2 is a sectional view taken along line I-I' of the display device of FIG. 1.
Figure 3:
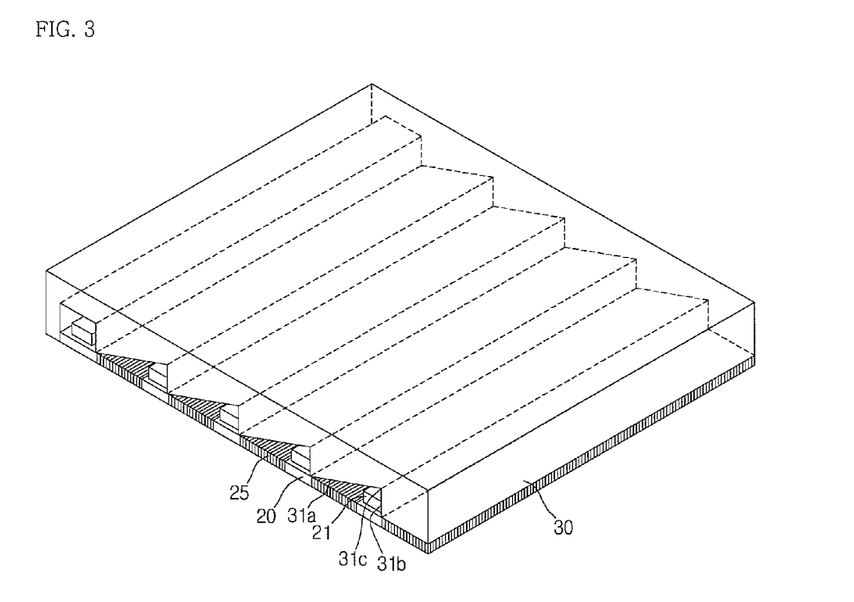
FIG. 3 is a perspective view illustrating a light source of FIG. 1.
Figure 4:
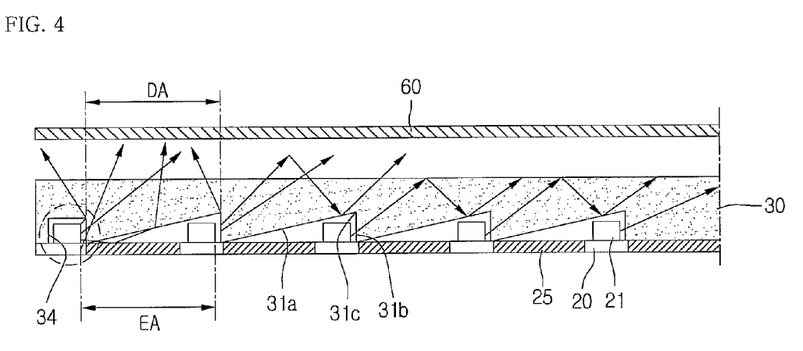
FIG. 4 is a schematic view illustrating the display device of FIG. 2.

FIG. 1 is an exploded perspective view of a display device according to a first embodiment. FIG. 2 is a sectional view taken along line I-I' of the display device of FIG. 1. FIG. 3 is a perspective view illustrating a light source of FIG. 1. FIG. 4 is a schematic view illustrating the display device of FIG. 2.

The display device according to the first embodiment includes a backlight unit and a display panel receiving light from the backlight unit to display an image. Thus, the display device together with the backlight unit will be described below.

Referring to FIGS. 1 to 3, the display device according to the first embodiment includes a bottom frame 10, a light emitting module disposed within the bottom frame 10, a reflection sheet 25, and a light guide plate 30.

In the display device, the light emitting module, the reflection sheet 25, and the light guide plate 30 disposed on the light emitting module and the reflection sheet 25 constitute a light emitting part. Here, an optical sheet 40 is disposed on the light guide plate 30, and the display panel 60 is disposed on the optical sheet 40. Also, a top frame 70 is disposed on the display panel 60.

The bottom frame 10 has a bottom surface 11 having a rectangular flat shape with two long sides facing each other and two short sides perpendicular to the long sides and facing each other and four sidewalls 12 vertically extending from the bottom surface 11.

The bottom frame 10 is coupled to a fixing member 50 disposed on the optical sheet 40 to receive the light emitting module, the reflection sheet 25, the light guide plate 30, and the optical sheet 40 within the bottom frame 10.

For example, the bottom frame 10 may be formed of a metal material. Also, a plurality of protrusions (not shown) may be disposed on the bottom surface 11 to enhance hardness.

The reflection sheet 25 and the plurality of light emitting modules alternately extend in an X-axis direction on the bottom surface 11 within the bottom frame 10.

Each of the light emitting modules may be formed in a bar-shape. Also, the light emitting module includes a module board 20 extending in the X-axis direction and a plurality of LEDs 21 disposed on the module board 20 in a row.

The module board 20 may include a metal core printed circuit board (metal core PCB), a FR-4 PCB, general PCB, a flexible board, and a ceramic board, but is not limited thereto. For example, a kind of the nodule board 20 may be variously varied within a technical scope of the embodiment.

The module board 20 may apply a power to each of the LEDs 21 to provide light into the light guide plate 30. Here, the LEDs 21 may be individually driven.

As shown in FIG. 1, the plurality of light emitting modules having the bar shape may be disposed. Alternatively, the light emitting module may be formed as a single board having a size corresponding to a front surface of the bottom frame 10.

The plurality of LEDs 21 arranged on the module board 20 may be side-view type LEDs in which light is emitted through side surfaces with respect to the module board 20. That is, the module board 20 may be disposed within a recess part 31 of the light guide plate 30 to emit light through a side surface of the recess part 31 of the light guide plate 30.

Each of the LEDs 21 may be a color LED that emits light having at least one color of red, blue, green, and white colors or an ultraviolet (UV) LED. Here, the color LED may include a red LED, a blue LED, a green LED, and a white LED. The disposition and emitted light of the LED 21 may be varied within the technical scope of embodiments.

The reflection sheet 25 includes a reflecting material and a reflective metal plate to re-reflect light leaking from the light guide plate 30. The reflection sheet 25 may be exposed between the module boards 20. As shown in FIG. 2, the plurality of reflection sheets separated from each other may be disposed in a region spaced between the module boards 20.

A plurality of heat dissipating members (not shown) may be further disposed between a light emitting part and the bottom frame 10.

The display device includes the light guide plate 30 diffusing and reflecting the light emitted from the LEDs 21 to produce planar light, thereby emitting the planar light onto the display panel 60 above the plurality of light emitting modules and the plurality of reflection sheets 25.

The integrated light guide plate 30 has a top surface and a bottom surface. The top surface through which the planar light is generated is flat, and a plurality of recess part 31 for receiving the LEDs 21 are defined in the bottom surface.

The recess part 31 may be an edge-type recess part 31 which has a first surface 31a, a second surface 31b, and an intersection line at which the first surface 31a meets the second surface 31c.

The first surface 31a may be an inclined surface which is inclined at a predetermined angle with respect to a plane of the light guide plate 30. The second surface 31b may be a surface perpendicular to the plane of the light guide plate 30.

The second surface 31b may be a light incident surface facing a side surface through which light of the LED 21 is emitted. The inclined surface of the first surface 31a may guide light incident into the second surface 31b that is the light incident surface toward the top surface of the light guide plate 30.

The intersection line 31c has a length equal to that of a length direction of the recess part 31. That is, when one recess part 31 receives the plurality of LEDs 21 constituting one row, the intersection line 31c may have a length from one end of the light guide plate 30 to the other end.

Here, the recess part 34 (a dot line of FIG. 4) disposed at an end of in a direction opposite to that in which light of the LED 21 is emitted in the recess parts 31 of the end of the light emitting plate 30 may have a square shape in section.

As shown in FIGS. 2 to 4, the LED 21 received in the recess part 31 of the light guide plate 30 is disposed adjacent to the second surface of the recess part 31 to emit light toward the adjacent second surface 31b. Also, the reflection sheet 25 is disposed under the first surface 31a of the recess part 31 and is not disposed on the second surface 31b that is a light incident surface.

As described above, the plurality of recess parts 31 may be defined in the bottom surface of the light guide plate 30. At least one LED 21 may be disposed in each of the recess parts to locally drive the LEDs while providing improved light uniformity.

The light guide plate 30 is divided into a plurality of light emitting areas EAs. Each of the light emitting areas EAs has a size defined by the number of LEDs 21 emitting light into the light emitting areas EAs.

That is, when the LEDs 21 are individually driven as shown in FIG. 1, the light emitting area EA may be a portion of the light guide plate 30 on which one LED 21 is disposed. On the other hand, when the plurality of LEDs are driven at the same time, the sum of portions of the light guide plate 30 on which the plurality of LEDs 21 driven at the same time are disposed may be defined as one light emitting area EA.

The light guide plate 30 does not have bodies separated for each of the light emitting areas EAs. That is, the light guide plate 30 may be formed in one body covering the entire region of the plurality of LEDs 21 disposed within the bottom frame 10.

That is, although the light guide plate 30 has the plurality of divided light emitting areas EAs, the light guide plate 30 is not physically divided, but abstractly divided by an operation of the LED 21 disposed on the corresponding light emitting area EA.

As described above, when the light guide plate 30 corresponding to one screen of the display panel 60 is formed in one body while being locally driven, a dark line occurring between the light guide plates 30 due to the physical separation of the light emitting areas EAs does not occur. Also, since a coupled portion is simplified, a slim backlight unit may be provided.

Also, the embodiment may provide a separate driving method such as local dimming method or impulsive method may be provided to reduce power consumption as well as to improve contrast of a screen, thereby improving an image quality of the display device.

Also, since the separate driving may be realized using the integrated light guide plate 30, light distribution may be accurately adjusted through the divided light emitting areas EAs. Also, since the LEDs 21 is driven for each area, light having brightnesses different from each other may be emitted into each of the divided light emitting areas EAs. Thus, the display device may have superior image beauty.

The light guide plate 30 may be formed of a transparent material. For example, the light guide plate 30 may be formed of one of an acryl-based resin such as polymethyl metaacrylate (PMMA), polyethylene terephthlate (PET), poly carbonate (PC), and polyethylene naphthalate (PEN).

The integrated light guide plate 30 may be integrally manufactured with respect to the display panel 60 defining one screen through an injection molding or extrusion.

A diffusion pattern (not shown) may be disposed on the top surface of the light guide plate 30.

The optical sheet 40 may be disposed on the light guide plate 30.

For example, the optical sheet 40 may include a first diffusion sheet 41, a prism sheet 42, and a second diffusion sheet 43. The diffusion sheets 41 and 43 diffuse light emitted from the light guide plate 30, and the diffused light is concentrated into the light emitting area EA by the prism sheet 42. Here, the prism sheet 42 may selectively include horizontal and/or vertical prism sheet(s) and at least one brightness enhanced film.

The optical sheet may be not provided. Alternatively, only one diffusion sheet 41 or 43 may be provided or only one prism sheet 42 may be provided. The optical sheet 40 may be variously selected in number or kind according to characteristics of required brightness.

A support member 50 is disposed on the optical sheet 40.

The support member 50 is coupled to the bottom frame 10 to closely attach the reflection sheet 20, the light emitting module, the light guide plate 30, and the optical sheet 40 to the bottom frame 10, thereby supporting the display panel 60.

For example, the support member 50 may be formed of a synthetic resin material or a metal material.

The display panel 60 is disposed on the support member 50.

The display panel 60 displays image information using light emitted from the light guide plate 30. For example, a liquid crystal display panel may be used as the display panel 60. The display panel 60 includes an upper board, a lower board, and a liquid crystal layer disposed between the upper and lower boards. The display panel 60 may further include polarization sheets closely attached to a top surface of the upper board and a bottom surface of the lower board.

The display panel 60 may be divided into a plurality of display areas DAs and driven to correspond to the local dimming method or the impulsive method. Here, the display area DAs of the display panel may corresponding to the light emitting area EAs of the light guide plate 30 as shown in FIG. 4.

A top frame 70 is disposed on the display panel 60.

The top frame 70 has a front part disposed on a front surface of the display device and a side part bent in a direction perpendicular to that of the front part and disposed on a side surface of the display device. The side part may be coupled to the support member 50 through a coupling member such as a screw (not shown).

Referring to FIGS. 1 to 4, in the display device according to the first embodiment, the backlight unit including the light guide plate integrated corresponding to the divided display areas DAs of the display panel 60 may be locally driven.

Hereinafter, a separate driving method of the backlight unit will be described with reference to FIG. 5.

Figure 5:
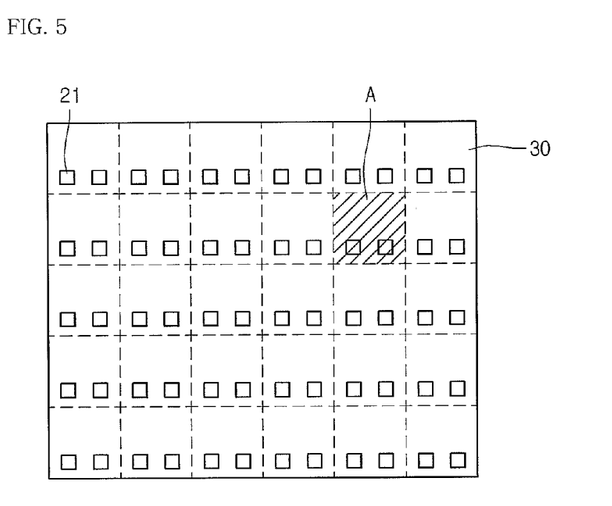
FIG. 5 is a plan view illustrating a separate driving method of a backlight unit of a display device according to an embodiment.

FIG. 5 is a plan view illustrating a separate driving method of a backlight unit.

The backlight unit of the display device of FIGS. 1 to 4 may be driven in a separate driving method. The separate driving method may include a local dimming method or impulsive method.

When the display device is driven in the local dimming method, the display panel 60 may be divided in a plurality display areas, and thus, the light emitting part may have a plurality of light emitting areas EAs.

As shown in FIG. 5, each of light emitting areas EAs may be defined as a potion A of the light guide plate 30 on which two LEDs 21 adjacent to each other are disposed. On the other hand, each of the LEDs 21 may define one light emitting area EA or N×M (N and M are integer values) LEDs 21 may define one light emitting area EA.

Here, brightness of at least one LED 21 disposed on each of the light emitting areas EAs may be separately adjusted according to a grey peak value of each of light emitting areas EAs. When the backlight unit is driven in the local dimming method, the LED 21 corresponding to the portion A of the light guide plate 30 that is the selected light emitting area EA may be selectively driven.

When the display device is driven in the impulsive method, the plurality of divided light emitting areas EAs may be synchronized with the display panel in time and successively turned on.

The separate driving of the display device may be variously changed according to a circuit design of the LED 21, but is not limited thereto.

Hereinafter, when the integrated light guide plate 30 of FIGS. 1 to 4 is provided to the display device performing the separate driving as described in FIG. 5, a structure for firmly coupling the integrated light guide plate 30 corresponding to the large-scale screen will be described with reference to FIGS. 6 to 9.

The display including the integrated light guide plate 30 includes a coupling part on an edge area to easily couple the bottom frame 10 to the integrated light guide plate 30.

Figure 6:
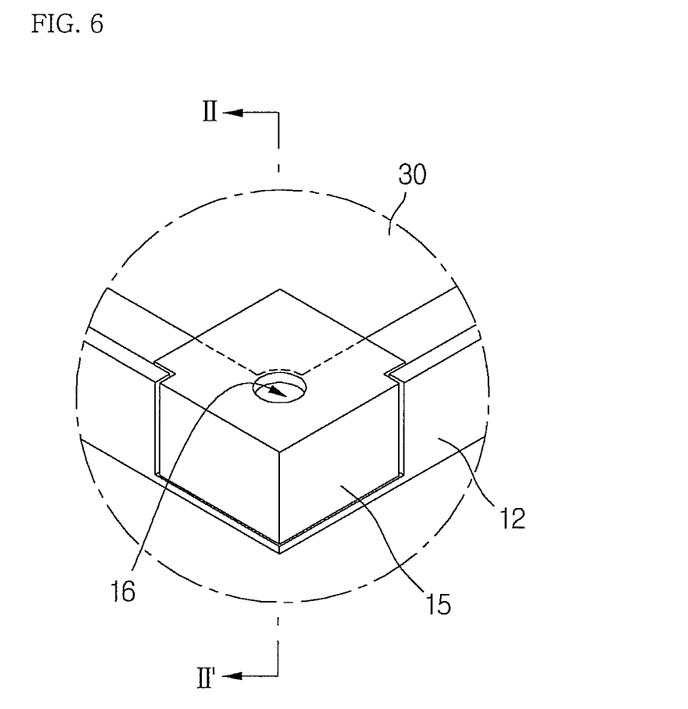
FIG. 6 is a perspective view illustrating one example of a coupling part of FIG. 1.
Figure 7:
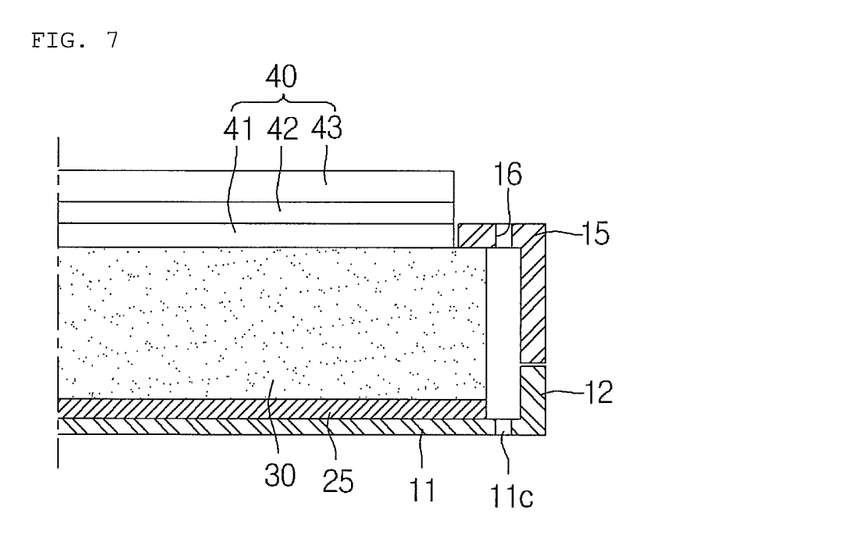
FIG. 7 is a sectional view taken along line II-II' of a coupling part of FIG. 6.

FIG. 6 is a perspective view illustrating one example of a coupling part according to the first embodiment. FIG. 7 is a sectional view taken along line II-II' of a coupling part of FIG. 6.

Referring to FIGS. 6 and 7, a display device according to an embodiment includes a coupling part disposed on an edge area.

The coupling part includes an edge area of a light guide plate 30, an edge area of a bottom frame 10, and a guide mold 15.

The edge area of the bottom frame 10 within the coupling part has a stepped portion by removing two sidewalls 12 up to a predetermined height as shown in FIG. 5.

The guide mold 15 covers an edge of the light guide plate 30 in the edge area and is aligned with the stepped sidewall 12 of the bottom frame 10.

That is, the guide mold 15 has a top surface covering the edge of the light guide plate 30 and two side surfaces adjacent to each other, which are vertically bent from two sides adjacent to each other of the top surface and aligned with the stepped sidewall 12 of the bottom frame 10.

A coupling hole 16 is defined in the top surface of the guide mold 15. The coupling hole 16 is aligned with a coupling hole 11a defined in a bottom surface 11 of the bottom frame 10.

As described above, the coupling hole 16 of the guide mold 15 and the coupling hole 11a of the bottom frame 10 are assembled through a coupling member such as a screw (not shown). Thus, the guide mold 15 may fix the integrated light guide plate 30 to the bottom frame 10.

Here, as shown in FIG. 6, the edge area of the light guide plate 30 may be recessed in the same shape as that of the coupling hole 16 so that the edge area is aligned with the coupling hole 16 of the guide mold 15.

Figure 8:
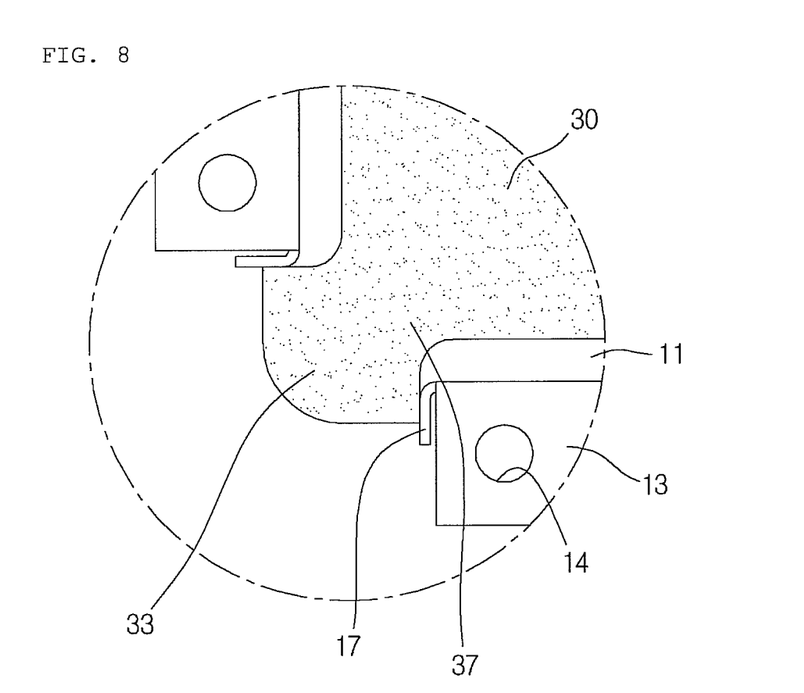
FIG. 8 is a front view illustrating another example of the coupling part of FIG. 6.
Figure 9:
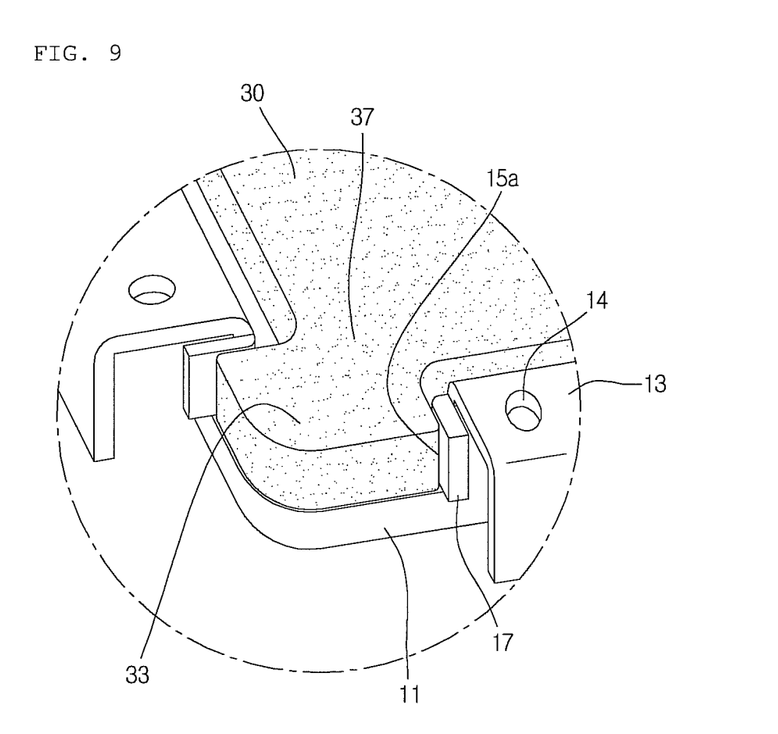
FIG. 9 is a perspective view illustrating another example of the coupling part FIG. 8.

The display device including the integrated light guide plate 30 may include a coupling part of FIGS. 8 and 9.

FIG. 8 is a front view illustrating another example of the coupling part of FIG. 6. FIG. 9 is a perspective view illustrating another example of the coupling part FIG. 8.

Referring to FIGS. 8 and 9, a sidewall 12 of a bottom frame 10 has a predetermined thickness. Also, the sidewall 12 includes a wing surface 13 which extends toward the outside in parallel to the bottom surface 11 and then is vertically bent. Thus, as shown in FIG. 6, a stepped portion opening an edge portion is provided.

As shown in FIGS. 8 and 9, the light guide plate 30 includes a protrusion neck 37 having a narrow width on an area in which two sides adjacent to each other constituting the edge are converged in a direction perpendicular to each other. Also, the light guide plate 30 includes a guide protrusion 33 extending from the protrusion neck 37 and having a width greater than that of the protrusion neck 37. The guide protrusion 33 protrudes to the outside through the opened edge portion defined by the stepped portion of the sidewall 12 of the bottom frame 10. Here, an end of the protruding guide protrusion 33 may be chamfered.

Thus, the guide protrusion 33 may be forcedly fitted between the stepped and opened sidewalls 12 of the bottom frame 10.

Here, the bottom frame 10 includes a guide member 17 extending from a side of the stepped portion of the sidewall 12 and bent along a side surface of the guide protrusion 33 on an area on which the sidewall 12 contacts the side surface of the guide protrusion 33.

The guide member 17 may be disposed on two sidewalls 12 constituting the edge area. The guide member 17 may be bent along the side surface of the guide protrusion 33 contacting each of the sidewalls 12 to prevent the light guide plate 30 from being scratched due to the stepped portion.

The coupling part of FIGS. 8 and 9 may further include a guide mold (not shown) as shown in FIGS. 6 and 7. Here, the coupling hole 14 may be defined in the wing surface 13 of the sidewall 13 of the bottom frame 10. Thus, the coupling hole 14 may be assembled with a coupling hole to be defined in the guide mold through a screw (not shown).

The coupling part of the display device may be disposed on the two edge areas facing each other on a diagonal line with respect to the integrated light guide plate 30 or may be disposed on four edge areas.

As described above, the coupling part for fixing the integrated light guide plate 30 on the two edge areas facing each other on the diagonal line may be provided to easily couple the integrated light guide plate 30 corresponding to one screen to the bottom frame 10 without bending the light guide plate 30.

Hereinafter, a display device including an integrated light guide plate 30 according to a second embodiment will be described with reference to FIG. 10.

Figure 10:
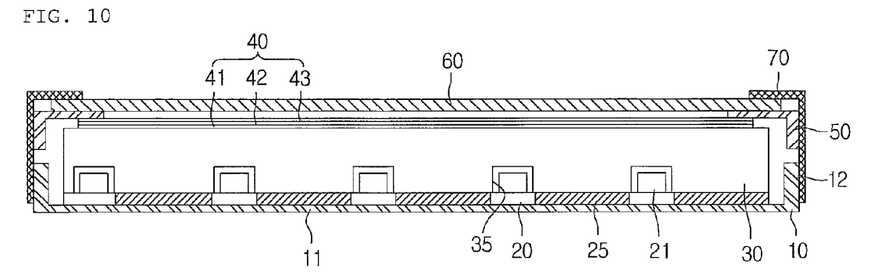
FIG. 10 is a sectional view of a display device according to a second embodiment.

FIG. 10 is a sectional view of a display device according to a second embodiment.

Like the display device of FIGS. 1 to 4, the display device of FIG. 10 includes an optical sheet 40, a fixing member 50, a display panel 60, and a top frame 70 on the light guide plate 30. Here, their descriptions will be omitted.

The display device of FIG. 10 includes a reflection sheet 25 and a light emitting module on a bottom frame 10. Also, the display device includes the integrated light guide plate 30 covering the reflection sheet 25 and the light emitting module.

Here, the integrated light guide plate 30 has a flat top surface through which planar light is provided onto the display panel 60 and a bottom surface in which a plurality of recess parts 35 are defined.

The recess part 35 has a square shape in section. Unlike FIGS. 2 to 4, the recess part 35 has a flat plate shape parallel to the top surface on a light guide area between the recess parts 35.

The LED 21 may be received in the recess part 35 of the light guide plate 30. The LED 21 may emit light toward one side surface of the recess part 35.

Here, a distance between the LED 21 and the side surface through which the light is emitted is near than that between the LED 21 and a side surface opposite to the side surface.

As described above, when a flat-type light guide plate is provided, the display device may be easily manufactured due to its simplified structure. Also, the LED 21 may be fixed to each of the recess parts 35 to easily fix the LED 21.

Also, since the light guide area of the light guide plate 30 is flat, an optical pattern such as a scattering pattern or a prism pattern may be easily formed.

The flat-type light guide plate 30 is divided into a plurality of light emitting areas EAs. Each of the light emitting areas EAs has a size defined by the number of LEDs 21 emitting light into the corresponding light emitting areas EAs.

The light guide plate 30 does not have bodies divided for each of the light emitting areas EAs and is formed in one body.

That is, although the light guide plate 30 has the plurality of divided light emitting areas EAs, the light guide plate 30 is not physically divided, but abstractly divided by an operation of the LED 21 disposed on the corresponding light emitting area EA.

As described above, when the light guide plate 30 corresponding to one screen of the display panel 60 is formed in one body while being locally driven, a dark line occurring between the light guide plates 30 due to the physical division of the light emitting areas EAs does not occur. Also, since a coupled portion is simplified, a slim backlight unit may be provided.

As described above, when the integrated light guide plate 30 having the flat-type recess part 35 is provided, manufacturing processes may be simplified. Also, the division driving such as local dimming or impulsive driving may be provided to reduce power consumption as well as improve contrast of a screen, thereby improving an image quality of the display device.

Hereinafter, a display device according to a third embodiment will be described with reference to FIGS. 11 to 12.

To align the integrated light guide plate 30, as shown in FIG. 2, a distance between the sidewalls 12 of the bottom frame 10 may be equal to a width of the integrated light guide plate 30. Also, the sidewalls 12 of the bottom frame 10 and the integrated light guide plate 30 are closely attached to each other without being spaced from each other. Also, the integrated light guide plate 30 may be forcedly fitted into the bottom frame 10 to enable the integrated light guide plate 30 to be accurately aligned in position.

Hereinafter, when the integrated light guide plate 30 is provided to the display device performing the separate driving as described in FIG. 5, various application examples of an alignment unit for guiding the integrated light guide plate 30 to accurately align the recess part 31 of the integrated light guide plate 30 with the LED 21 will be described with reference to FIGS. 13 to 17.

Figure 13:
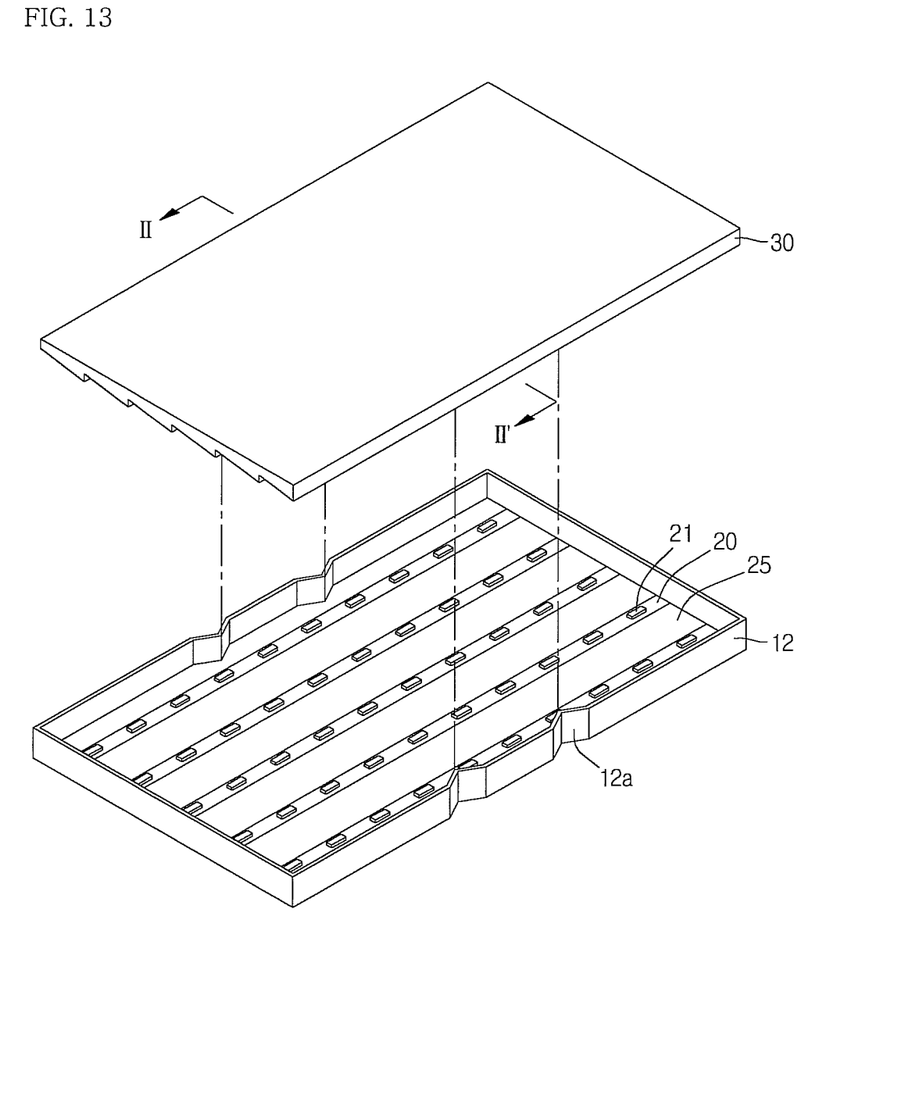
FIG. 13 is a perspective view illustrating a second application example of an alignment unit according to the third embodiment.
Figure 14:
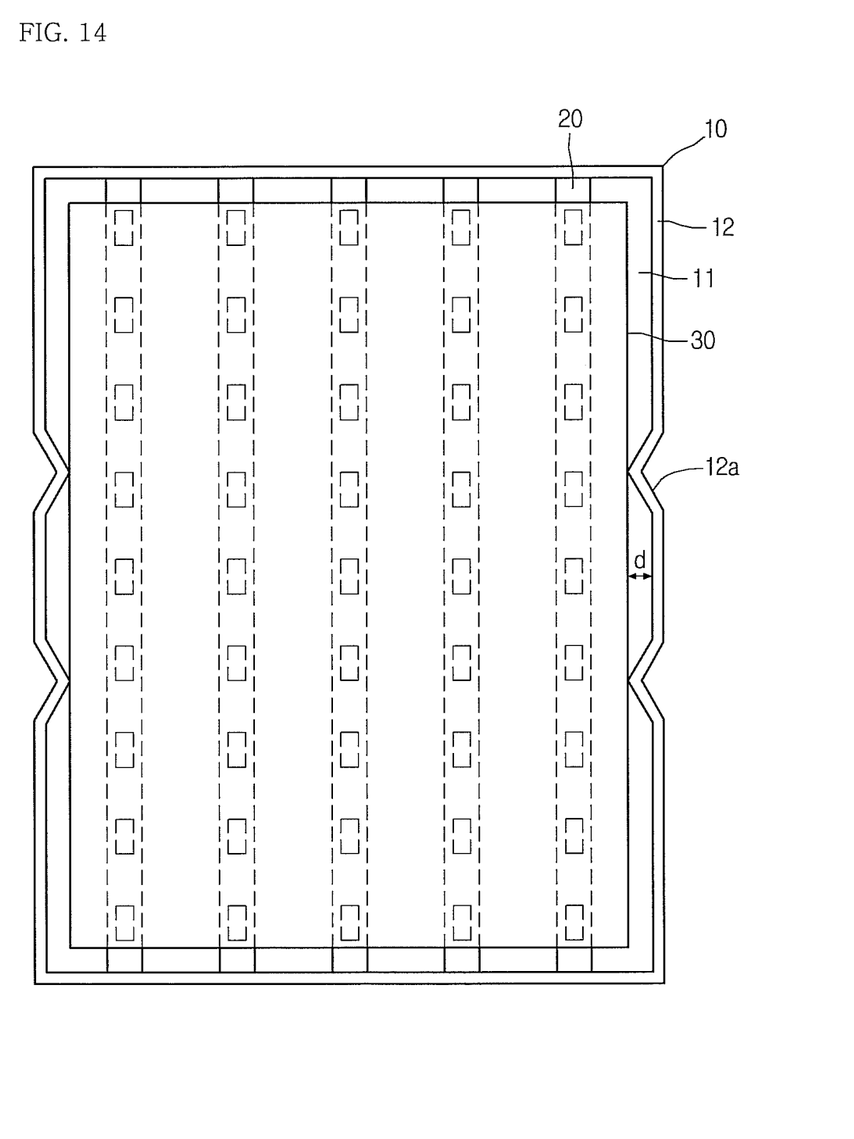
FIG. 14 is a top view of the alignment unit of FIG. 13.

FIG. 13 is a perspective view illustrating a second application example of an alignment unit according to a third embodiment. FIG. 14 is a top view of the alignment unit of FIG. 13.

Figure 11:
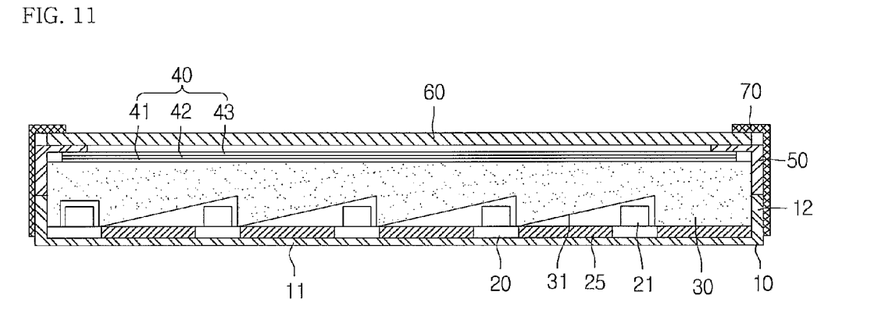
FIG. 11 is a sectional view taken along line I-I' of the display device of FIG. 1 and illustrates a first application example of an alignment unit.
Figure 12:
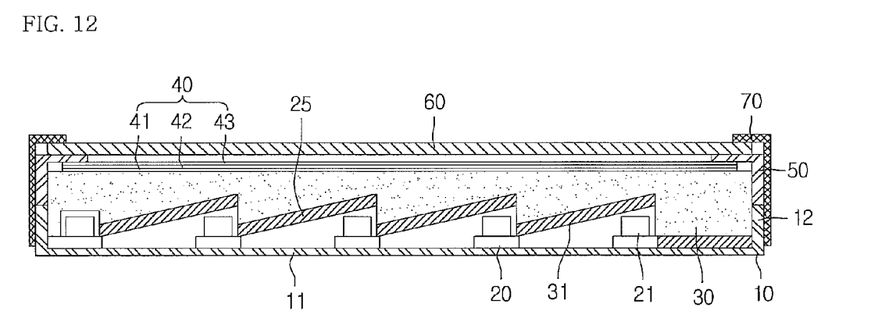
FIG. 12 is a sectional view of a modified example according to a third embodiment.

Unlike the first application example of FIG. 11, in a display device according to the second application example, a distance between sidewalls 12 facing each other of a bottom frame 10 is greater than a width of an integrated light guide plate 30. Also, a predetermined spaced distance d may occur between the bottom frame 10 and the integrated light guide plate 30 received in the bottom frame 10.

An alignment unit for guiding the integrated light guide plate 30 is disposed within an area of the spaced distance d.

The alignment unit includes a guide protrusion 12a protruding from a sidewall 12 of the bottom frame 10 toward the inside of the bottom frame 10.

The guide protrusion 12a may be disposed on two sidewalls 12 facing each other of four sidewalls 12 or on the whole four sidewalls 12.

At least one guide protrusion 12a may be disposed on one sidewall 12. Alternatively, the guide protrusion 12a may be provided in plurality.

The guide protrusion 12a may protrude toward a center to have a length equal to a distance spaced between the sidewall 12 and the integrated light guide plate 30. An end of the guide protrusion 12a may contact the side surface of the integrated light guide plate 30 to guide the integrated light guide plate to an accurate position.

As shown in FIGS. 13 and 14, the guide protrusion 12a may be bent inward from the sidewall 12 to form a triangular shape. On the other hand, the guide protrusion 12a may be chamfered at a portion contacting the side surface of the integrated light guide plate 30.

As described above, the guide protrusion 12a may be disposed on the sidewall 12 of the bottom frame 10 to fix the integrated light guide plate 30 in position. Thus, the integrated light guide plate 30 may be easily aligned with the plurality of LEDs disposed on the bottom surface thereof.

Figure 15:
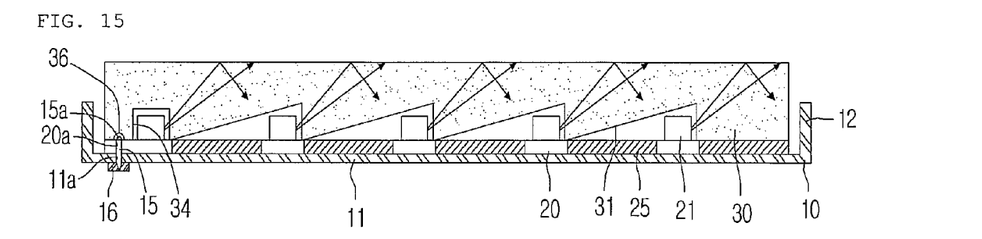
FIG. 15 is a sectional view illustrating a third application example of the alignment unit according to the third embodiment.

FIG. 15 is a sectional view illustrating a third application example of the alignment unit according to the third embodiment.

Referring to FIG. 15, a display device according to the third application example includes a light guide plate 30, a module board 20 under the light guide late 30, and at least one alignment unit on the bottom frame 10 in addition to the display device according to the foregoing first embodiment.

As shown in FIG. 15, the alignment unit includes at least one board hole 20a defined in the module board 20 and at least one frame hole 11a aligned with the board hole 20a and defined in a bottom surface 11 of the bottom frame 10.

A bolt coupling member 15 such as a screw passes through the board hole 20a and the frame hole 11a which are aligned with each other. A nut 16 coupled to the coupling member 15 is disposed on a back surface of the bottom frame 10.

In the coupling member 15, a bolt head 15a protrudes upward from the module board 20. A bolt recess 36 for burying the bolt head 15a is defined in the bottom surface of the light guide plate 30.

As described above, at least one alignment unit may be provided to the display device and the bolt heat 15a may be buried in the bolt recess 36 of the integrated light guide plate 30 to align the integrated light guide plate 30 in position.

Figure 16:
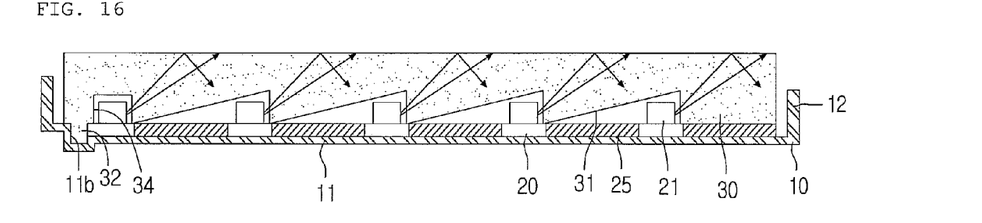
FIG. 16 is a sectional view illustrating a fourth application example of the alignment unit according to the third embodiment.

FIG. 16 is a sectional view illustrating a fourth application example of the alignment unit according to the third embodiment.

Referring to FIG. 16, a display device includes a light guide plate 30 and at least one alignment unit on a bottom frame 10 under the light guide plate 30 in addition to the display device according to the foregoing first embodiment.

As shown in FIG. 16, the alignment unit includes at least one light guide plate recess 11b defined in the bottom frame 10 and a light guide plate protrusion 32 protruding from a bottom surface of the integrated light guide plate 30 toward the bottom frame 10.

The light guide plate recess 11b and the light guide plate protrusion 32 may be aligned with each other to forcedly fit the light guide plate protrusion into the light guide plate recess 11b. The light guide plate protrusion 32 may be integrally formed with the integrated light guide plate 30.

At least one alignment unit constituting the light guide plate recess lib and the light guide plate protrusion 32 may be disposed on the display device. Also, the alignment unit may be disposed on an edge area of the integrated light guide plate 30.

As described above, the protrusion 32 may be disposed on the bottom surface of the light guide plate 30 and fitted into the bottom frame 10 to locate the light guide plate 30 in position when the integrated light guide plate 30 is aligned.

Figure 17:
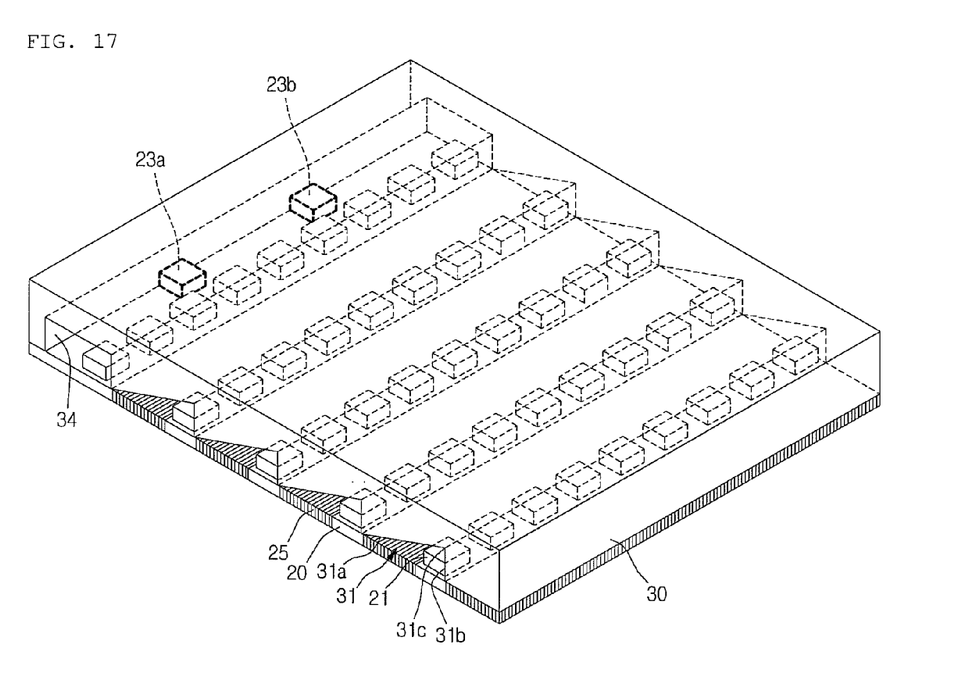
FIG. 17 is a perspective view illustrating a fifth application example of the alignment unit according to the third embodiment.

FIG. 17 is a perspective view illustrating a fifth application example of the alignment unit according to the third embodiment.

Referring to FIG. 17, according to the fifth application example, the display device includes at least one dummy LED 23a or 23b disposed on an area except a light emitting area.

The dummy LEDs 23a and 23b may be disposed on an edge area and an edge of a direction opposite to that in which light is emitted. Also, the dummy LEDs 23a and 23b may be disposed on an effective LED 21 and the same module board 20.

The dummy LEDs 23a and 23b may get out of a row with respect to the effective LED 21 disposed on the module board 20 to emit light onto the light emitting area.

That is, the effective LED 21 of FIGS. 1 to 16 forms one row in a recess part 34. On the other hand, the dummy LEDs 23a and 23b may get out of the row of the effective LED 21 and perform the same function as a hook of the recess part 34 of the integrated light guide plate 30.

When the integrated light guide plate 30 has the recess part 34 which is capable of receiving LEDs 21 constituting one row at the same time, the dummy LEDs 23a and 23b getting out of the row of the corresponding recess part 34 may contact a side surface opposite to a light incident surface of the recess part 34.

When the integrated light guide plate 30 has the recess part 34 which is capable of receiving LEDs 21 constituting one row at the same time, the dummy LEDs 23a and 23b getting out of the row of the corresponding recess part 34 may contact a side surface opposite to a light incident surface of the recess part 34.

When the light guide plate 30 are formed in one body as shown in FIGS. 11 to 17, a reference point for accurately locating the integrated light guide plate 30 may be provided to prevent the plurality of LEDs 21 from being misaligned when the plurality of LEDs 21 are aligned with one sheet of light guide plate 30. Here, the various application examples of FIGS. 11 to 17 may be applied to one display device at the same time.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit configured to emit light onto a panel in which one screen is defined into a plurality of display areas, the backlight unit comprising:
    a bottom frame having a bottom surface and a sidewall;
    a plurality of light emitting diodes (LEDs) disposed on the bottom surface of the bottom frame, the plurality of LEDs defining a plurality of light emitting areas corresponding to the display areas of the panel;
    an integrated light guide plate disposing the plurality of LEDs, the integrated light guide plate being disposed on the plurality of light emitting areas corresponding to one screen; and
    a coupling part coupling the integrated light guide plate to the bottom frame,
    wherein, the coupling part, each of the two sidewalls adjacent to each other of the bottom frame has a stepped portion, and a guide mold covering an edge of the integrated light guide plate above the stepped portion.

2. The backlight unit according to claim 1, wherein a plurality of recess parts are provided in a bottom surface of the light guide plate, and the LEDs are received in the recess parts so that light is incident into a side surface of the recess parts.

3. The backlight unit according to claim 1, wherein the coupling part has a square shape and is disposed on at least two or more edges.

4. The backlight unit according to claim 1, wherein the guide mold comprises:
    a top surface covering the edge of the integrated light guide plate; and
    two side surfaces vertically bent and extending from the top surface, the two side surfaces being aligned with the stepped sidewalls of the bottom frame.

5. The backlight unit according to claim 1, wherein the coupling part has a coupling hole aligned with the top surface of the guide mold and the bottom surface of the bottom frame.

6. A display device comprising:
    the backlight unit according to claim 1; and
    a display panel disposed on the backlight unit, the display panel defining one screen into a plurality of display areas to receive light from the backlight unit.

7. The display device according to claim 6, wherein a plurality of recess parts are provided in a bottom surface of the integrated light guide plate, and the LEDs are received in the recess parts so that light is incident into a side surface of the recess parts.

8. The display device according to claim 6, wherein the coupling part has a square shape and is disposed on at least two or more edges.

9. The display device according to claim 6, wherein the guide mold comprises:
    a top surface covering the edge of the integrated light guide plate; and
    two side surfaces vertically bent and extending from the top surface, the two side surfaces being aligned with the stepped sidewalls of the bottom frame.

10. The display device according to claim 6, wherein the coupling part has a coupling hole aligned with the top surface of the guide mold and the bottom surface of the bottom frame.

11. A backlight unit configured to emit light onto a panel in which one screen is defined into a plurality of display areas, the backlight unit comprising:
    a bottom frame having a bottom surface and a sidewall;
    a plurality of light emitting diodes (LEDs) disposed on the bottom surface of the bottom frame, the plurality of LEDs defining a plurality of light emitting areas corresponding to the display areas of the panel;
    an integrated light guide plate disposing the plurality of LEDs, the integrated light guide plate being disposed on the plurality of light emitting areas corresponding to one screen; and
    a coupling part coupling the integrated light guide plate to the bottom frame,
    wherein the coupling part comprises:
    a protrusion neck in which two sides adjacent to each other are vertically converged at an edge of the integrated light guide plate; and
    a guide protrusion extending from the protrusion neck, the guide protrusion having a width greater than that of the protrusion neck.

12. The backlight unit according to claim 11, wherein each of the sidewalls of the bottom frame comprises an opening exposing the guide protrusion of the integrated light guide plate at the edge thereof.

13. The backlight unit according to claim 11, further comprising a guide member extending from the sidewall and bent along one surface of the guide protrusion.

14. The backlight unit according to claim 11, wherein a plurality of recess parts are provided in a bottom surface of the light guide plate, and the LEDs are received in the recess parts so that light is incident into a side surface of the recess parts.

15. A display device comprising:
   the backlight unit according to claim 11; and
   a display panel disposed on the backlight unit, the display panel defining one screen into a plurality of display areas to receive light from the backlight unit.

16. The display device according to claim 15, wherein each of the sidewalls of the bottom frame comprises an opening exposing the guide protrusion of the integrated light guide plate at the edge thereof.

17. The display device according to claim 15, further comprising a guide member extending from the sidewall and bent along one surface of the guide protrusion.

18. The display device according to claim 15, wherein a plurality of recess parts are provided in a bottom surface of the light guide plate, and the LEDs are received in the recess parts so that light is incident into a side surface of the recess parts.

* * * * *